United States Patent [19]
Brookshire

[11] 4,108,698

[45] Aug. 22, 1978

[54] ROMAN SHADE AND METHOD FOR MAKING SAME

[75] Inventor: Phillip L. Brookshire, Cincinnati, Ohio

[73] Assignee: Clopay Corporation, Cincinnati, Ohio

[21] Appl. No.: 799,542

[22] Filed: May 23, 1977

Related U.S. Application Data

[62] Division of Ser. No. 676,347, Apr. 12, 1976, Pat. No. 4,069,857.

[51] Int. Cl.[2] ........................ B29C 27/00; A47H 5/00

[52] U.S. Cl. ........................................ 156/60; 156/65; 156/227

[58] Field of Search ............... 160/84 R, 344; 156/65, 156/204, 227, 219

[56] References Cited

U.S. PATENT DOCUMENTS

| | | | |
|---|---|---|---|
| 1,752,610 | 4/1930 | McSpadden | 160/84 R |
| 2,126,834 | 8/1938 | Steinberger | 160/388 |
| 2,524,584 | 10/1950 | Zehr | 156/204 |
| 2,884,053 | 4/1959 | Truesdale | 156/219 |
| 3,777,800 | 12/1975 | Susoer | 160/84 R |

*Primary Examiner*—David A. Simmons
*Attorney, Agent, or Firm*—Wood, Herron & Evans

[57] ABSTRACT

A Roman shade is formed from plastic sheet material having a heat sealable characteristic. Transverse, horizontally extending pleats are folded in the shade and are heat sealed to permanently secure them. A bottom hem is formed by folding and heat sealing a bottom portion of the shade together, and the terminal end portion of the shade may be joined to a bottom horizontally extending pleat, either within or adjacent the pleat, so that the bottom pleat and hem are formed at the same time. Apertures, through which shade pull strings are guided, are provided in the pleats.

9 Claims, 6 Drawing Figures

ROMAN SHADE AND METHOD FOR MAKING SAME

This is a division, of application Ser. No. 676,347, filed Apr. 12, 1976, now U.S. Pat. No. 4,069,857.

BACKGROUND OF THE INVENTION

Draperies or curtains of the general type referred to as "Roman shades" are well known in the art. Examples of these are found, for example, in U.S. Pat. Nos. 1,752,610; 3,322,182, 3,439,725; and 3,487,875. Essentially, the shades disclosed therein are constructed so that, when raised, the shades are gathered in generally horizontal folds to provide the effects of a Roman shade. To operate these shades, various guide or pull strings are used in conjunction with string guides attached to the shades. One method of guiding the various strings is to thread them through guide rings attached to the shade as shown in U.S. Pat. Nos. 3,322,182 and 3,487,875. In this construction, separate guide rings must be attached to the shades. Another method of attaching the various strings is to thread them through apertures in fabric shade pleats which pleats are formed and stiffened by metal slats. Such construction is disclosed in U.S. Pat. No. 1,752,610 and requires that additional metal slats be crimped onto the pleats. Additionally, this last mentioned patent teaches that the guide strings remain in the opening in which the shade is mounted even when the shade is raised.

As exemplified by these patents, the manufacture of Roman shades by known techniques involves a relatively large number of steps. After the fabrics are sewn together, separate fabric strips are usually secured to the fabric for support and to hold guide rings. Additional steps of securing either guide rings to the shade or of securing stiffening slats have been necessary. These steps have added to the expense of Roman shade production. Furthermore, the use of woven fabrics in the manufacture of Roman shades have added to their expense.

SUMMARY OF THE INVENTION

The present invention provides a Roman shade and method of making a Roman shade, each having unique advantages associated therewith. In one of its aspects, this invention provides a Roman shade of simple construction, yet still achieving the desirable aesthetic effects associated with known structures. Furthermore, plastic sheet material has been fashioned and formed into a pleasing, decorative shade having the appearance of fabric and providing the traditional Roman shade effect. The shade and method of this invention eliminate manufacturing steps and materials heretofore involved in prior art techniques represented by the patents mentioned heretofore. Additionally, Roman shades can be manufactured in an efficient, highly economical manner employing the principles of this invention. Still further, another objective of the invention has been to provide a Roman shade having an improved bottom hem and methods for making such improved hems.

Accordingly, the invention contemplates a Roman shade made from plastic sheet material. The plastic may either be embossed, thereby simulating woven fabric, or plain, and may comprise a laminated or multi-ply plastic sheet material with woven backing or the like. The shade has a plurality of horizontally extending transverse pleats which are formed by folding portions of the plastic material on itself and sealing them together. In its preferred form, the plastic shade material is thermoplastic sheet material, or a composite thereof, which permits it to be heat sealed to itself. Pull string guide holes are formed or punched in the pleats. In its preferred embodiment, the invention contemplates a shade bottom hem formed by turning up the terminal end of the shade material and heat sealing it to an upper portion thereof. In alternate embodiments, the bottom hem is formed in conjunction with a bottom horizontally extending pleat just above the hem, the terminal end of the shade forming a portion of the bottom pleat and being heat sealed within or adjacent it.

Thus, according to the principles of the invention, manufacturing and cost drawbacks associated with known Roman shades are avoided. Furthermore, a complete integrally formed Roman shade is provided by this invention, thereby eliminating stitching, separately attached guide rings, supporting strips and the like, as has heretofore been necessary with the prior art structures. In another of its features stiffening slats or supporting members are unnecessary because the unique pleating structure provides support and gives desirable aesthetic effects. The shade is operable with only pull strings, and no additional guide strings, which otherwise might remain in the opening when the shade is raised, are necessary.

These and other objects and advantages will become readily apparent from the following description of a preferred embodiment and from the drawings in which.

Figure 1:
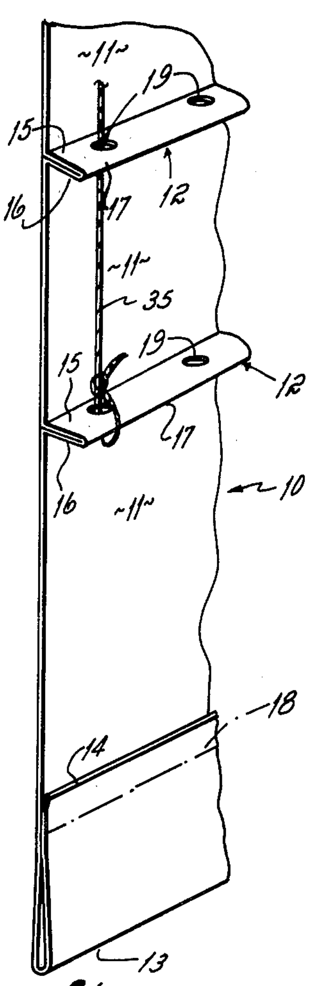
FIG. 1 is a rear view of a portion of a Roman shade according to the invention and shows the attachment of one pull string to a shade pleat.
Figure 2:
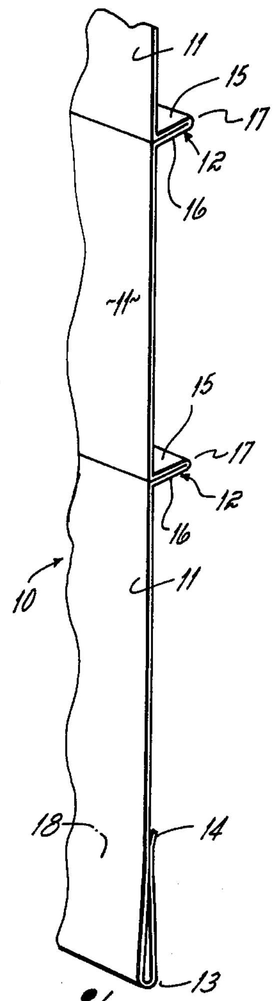
FIG. 2 is a front view of a Roman shade of FIG. 1.

Referring now particularly to the drawings, FIG. 1 thereof shows a Roman shade 10 according to the invention. The shade is shown in an extended form and has relatively flat vertically planar portions 11 separated by transverse horizontally extending pleats 12. The shade has a bottom portion, in which a bottom hem 13 is formed, and which includes a terminal end 14. The shade is made from plastic sheet material having the characteristic that one portion of the material can be heat sealed to another upon the application of heat and pressure thereto. The shade material can be made from a number of synthetic resins having the property of thermoplasticity and including vinyl resins, polyesters, and polyolefins such as polyethylene and the like. The shade can be in either a single sheet form, or of a composite including, for example, a single or multiple ply plastic sheet having a woven fabric backing. Additionally, the shade can be embossed, with a predetermined decorative pattern, printed upon, or otherwise decorated, all to provide a desired decorative effect such as simulating the appearance of fabric.

The transverse horizontally extending pleats 12 are formed from upper and lower portions 15 and 16 which are folded as at 17. Once the upper and lower portions 15 and 16 are folded together, heat and pressure are applied by any suitable means in order to seal the portions 15 and 16 together and to thereby permanently form the transverse, horizontally extending pleats 12.

The bottom hem 13 is formed by folding a lower portion of the shade, including the terminal end 14, upon itself and by heat sealing the hem along the heat seal line 18 to permanently form the hem.

While FIG. 1 illustrates only a portion of the Roman shade according to the invention, it will be understood that the full shade may incorporate more than two horizontally extending pleats 12. Once the pleats have been formed in the shade, apertures 19 are formed in the pleats by any suitable means, such as punching or melting, to provide a guide for pull strings 35, one of which is shown in FIG. 1. Alternately, the holes could be pre-punched in the shade so as to register when the shade pleats are formed.

Figure 5:
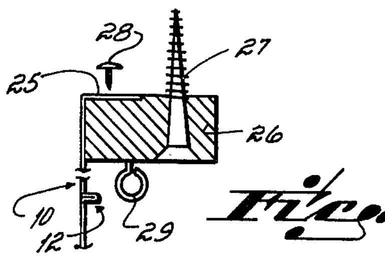
FIG. 5 is a cross-sectional view of a mounting bar for the Roman shade.

In use, a complete Roman shade such as the one shown in FIG. 1 can be mounted within an opening by the apparatus disclosed in FIG. 5. Essentially, an upper portion 25 of the shade 10 is bent around the mounting block 26 and secured thereto by tacks 28, or by other means. The mounting block 26 is of a length to traverse the upper portion of the opening with which the shade is to be used and is secured therein by any appropriate means such as screws 27. Pull string guides such as screw eyes 29 are provided in the mounting block 26 to guide the shade pull strings as will be described.

Figure 6:
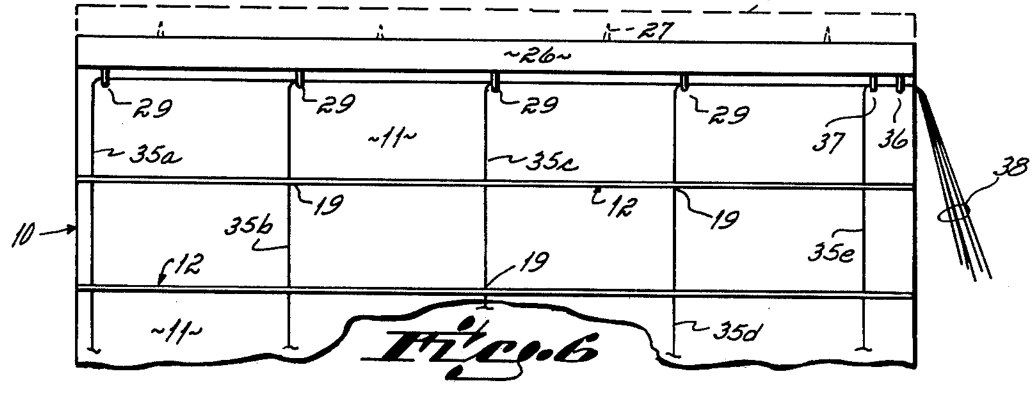
FIG. 6 is a rear view of a Roman shade according to the invention and showing a mounted shade and its pull string construction.

A rear view of a mounted shade is shown in FIG. 6. The mounting block 26 is secured to the frame of an opening, such as a window frame, shown by the dotted lines 30. A plurality of pull strings 35*a*–35*e* are threaded through the initial screw eyes 36 and 37 and thereafter through the screw eyes 29 as shown. At each successive screw eye 29, one of the pull strings is separated from the remainder of the strings, and is directed downwardly and threaded through the apertures 19 of the horizontal pleats 12 of the shade. The remainder of strings are threaded through succeeding screw eyes 29 and downwardly through the pleats 12 as shown.

The bottom of each string is secured at a bottom area of the shade in any convenient manner. In FIG. 1 a string 35 is shown as attached by tying to the bottommost pleat 12. This leaves a decorative shade panel when the shade is fully drawn, between the last pleat and the bottom hem of the shade.

When the plurality of the strings 38 is grasped and pulled, each of the strings 35*a*–35*e* is tensioned to pull up on the bottom of the shade and thereby raise the shade within the opening. As the shade is raised, the portions 11 are gathered in generally horizontal folds to provide a Roman shade effect. Of course, it will be appreciated that the shade 10 could be mounted within an opening in any suitable manner, other than as shown, and that the pull strings 35*a* through 35*e* could be mounted or actuated by other means.

Figure 3:
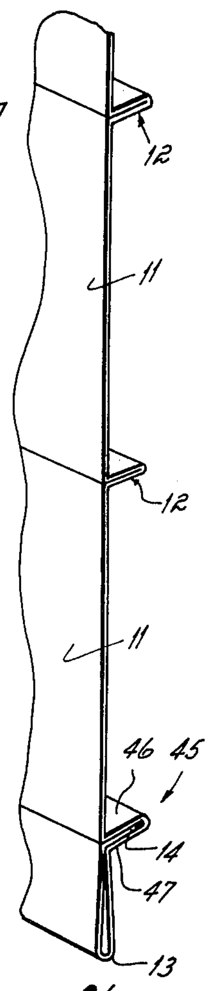
FIG. 3 is a front view of a portion of a Roman shade having a first alternate bottom pleat and hem.

FIG. 3 illustrates an alternate embodiment of the bottom hem formation wherein the terminal end of the shade is utilized to form a portion of a bottom horizontally extending pleat 45. The shade shown in FIG. 3 differs from that shown in FIG. 1 only in the formation of the bottom hem and the bottom horizontally extending pleat 45. Like parts of the shade will thus be designated by like numbers.

Bottom horizontally extending pleat 45 is formed at the bottom of the shade but above the hem. The terminal end 14 of the shade is inserted between the upper portion 46 and the lower portion 47 of pleat 45 so that the terminal end 14 is thus secured within the bottom horizontal pleat 45. Once the portions 46 and 47 have been folded over and the terminal end of the shade 14 inserted, heat and pressure are applied to the pleat 45 in order to seal it together, thereby forming the bottom horizontally extending pleat and the bottom hem of the shade at the same time.

Figure 4:
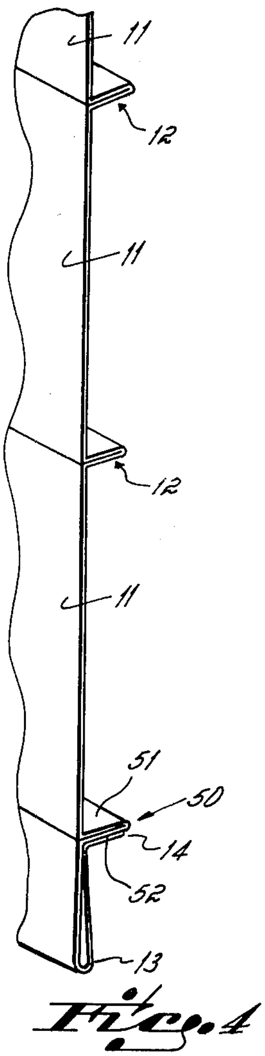
FIG. 4 is a front view of a Roman shade having a second alternate bottom pleat and hem.

FIG. 4 illustrates still another embodiment of a Roman shade wherein a bottom horizontally extending pleat 50 is formed with an upper portion 51, a bottom or underside portion 52 and a terminal end portion 14 of the shade. In this embodiment, as shown in FIG. 4, the bottom horizontal pleat 50 is formed by folding upper portion 51 and underside portion 52 together, and thereafter placing the terminal end portion 14 of the shade against the underside portion 52 of the pleat 50. After the shade portions have been so disposed, heat and pressure is applied thereto in order to permanently seal them and to thus simultaneously form the bottom horizontally extending pleat 50 and the bottom hem 13.

Contrasting the embodiments shown in FIG. 3 and FIG. 4, it will be appreciated that in FIG. 3, the bottom portion of the shade, including the terminal end, is folded forwardly to form the bottom hem 13 and then is inserted into the pleat 45. In the embodiment shown in FIG. 4, however, the bottom portion of the shade including the terminal end 14 is folded rearwardly to form the bottom hem 13 and is thereafter attached to the underside portion 52 and adjacent to bottom pleat 50. In each case, however, the terminal end portion 14 forms a portion of the bottom horizontally extending pleats 45 and 50 respectively. Further, the pull strings (not shown in FIGS. 3 and 4) can be attached to either the bottommost pleat or to the second pleat up in order to leave a vertically hanging decorative panel between the respective pleats 12 and 45 or 50 when the shade is drawn.

To make a Roman shade according to the invention, it is only necessary to cut the appropriate plastic material to size, to fold it as described above to form the horizontally extending pleats and the bottom hems and to thereafter heat-seal the pleats and the hem in order to permanently form the shade. The only other step is to supply apertures 19 in the horizontally extending pleats and to thereafter mount the shade in an opening, the shade pull strings being extended through the apertures 19 and attached to the shade bottoms in any suitable manner. It is entirely unnecessary to apply additional and separate guide rings for the pull strings, and it is unnecessary to provide any form of metal stiffening slats or the like in order to maintain the horizontally extending pleats in their desired configuration. In addition, it is unnecessary to provide guide strings for the shade such as would be left in the opening when the shade is raised.

These and other modifications and advantages will become readily apparent to those of ordinary skill in the art without departing from the scope of the invention herein, and the applicant intends to be bound only by the claims appended hereto.

I claim:

1. A method of making a plastic Roman shade having a top portion and a bottom portion and a plurality of spaced, horizontally extending pleats extending substantially from one side of said shade to another and between said top and said bottom portions, and pull strings for raising and lowering said shade, said method comprising the steps of:

folding said shade together, between said bottom and top portions, to form folded horizontal pleats, heat sealing said shade in the areas of said folded pleats, to form said horizontally extending pleats in said shade, and forming, on at least one side of said shade, pull string guide means in association with said horizontally extending pleats, said guide means for operatively holding shade pull strings therein.

2. A method as in claim 1, including the step of forming aperatures in said pleats for receiving said pull strings.

3. A method as in claim 1 including the further step of heat sealing a bottom portion of said shade proximate a terminal end thereof to form a bottom hem in said shade.

4. A method as in claim 1 wherein said shade has a top portion and a bottom portion, including the step of forming a bottom hem in said shade by folding a portion of the bottom portion of said shade and heat sealing it upon itself.

5. A method as in claim 1 wherein said method includes the step of embossing said sheet material to provide a predetermined design therein.

6. A method as in claim 1 wherein said plastic shade comprises a composite of thermoplastic sheet material and a woven backing material.

7. A method of making a plastic Roman shade having a top portion and a bottom portion, a terminal end at said bottom portion, and a plurality of spaced, horizontally extending pleats between said top and bottom portions the method including the steps of folding portions of a thermoplastic sheet material upon itself to form said pleats, and thereafter heat sealing said portions to adhere them together in order to secure said pleats in said shade, forming apertures in said pleats for receiving pull strings, forming a bottom hem in said shade by folding a portion of the bottom portion of said shade and heat sealing it upon itself, and including the step of forming a horizontally extending pleat in said shade near said bottom portion, but above said hem, by heat sealing portions of said shade above said hem together with said terminal end thereof.

8. A method as in claim 7 wherein the step of forming said horizontally extending pleat includes inserting said terminal end into said horizontally extending pleat near said bottom portion.

9. A method as in claim 7 wherein the step of forming said horizontally extending pleat includes heat sealing said terminal end to an underside portion of said horizontally extending pleat near said bottom portion.

* * * * *